United States Patent [19]

Rendemonti

[11] 4,137,952
[45] Feb. 6, 1979

[54] APPARATUS FOR SPRAYING DIVERSE FLUIDS WITHIN THE CAB OF A VEHICLE

[76] Inventor: Louis Rendemonti, 700 New York Ave., Point Pleasant, N.J. 08742

[21] Appl. No.: 812,775

[22] Filed: Jul. 5, 1977

[51] Int. Cl.² .............................................. B65B 1/04
[52] U.S. Cl. ..................................... 141/27; 141/383; 222/145; 239/345
[58] Field of Search ....................... 222/74, 75, 82, 91, 222/129, 129.2–129.4, 133, 145, 193, 526, 527, 49; 141/21, 25, 27, 346–351, 382–386, 392; 239/345, 346

[56] References Cited

U.S. PATENT DOCUMENTS

| | | | |
|---|---|---|---|
| 1,603,612 | 10/1926 | Krautzberger | 239/345 |
| 2,200,675 | 5/1940 | Northcutt | 222/145 |
| 2,216,890 | 10/1940 | Philipps | 222/129.4 |
| 2,610,433 | 9/1952 | Chisholm et al. | 222/193 |
| 2,621,971 | 12/1952 | Zublin | 239/345 |

Primary Examiner—Robert J. Spar
Assistant Examiner—H. Grant Skaggs
Attorney, Agent, or Firm—James M. Rhodes, Jr.

[57] ABSTRACT

Apparatus is herein described for spraying the inside of a vehicle. Essentially, the apparatus includes a source of liquid deodorant, a source of liquid disinfectant and a source of pressurized gas. The source of liquid disinfectant is communicated with a gas hose which in turn communicates with the source of pressurized gas at one terminal end and which is provided with a dispenser head at the other terminal end thereof.

The dispenser head is provided with a trigger for opening a valve upon the opening of which liquid disinfectant is drawn from the source of liquid disinfectant by pressurized gas traveling through the hose and out the dispenser head. The dispenser head is provided with a reservoir for storing a metered portion of liquid deodorant. The reservoir communicates with a passageway extending through the dispenser head so that liquid deodorant is aspirated by the pressurized gas as it passes through the dispenser head before being ejected thereby. The reservoir for storing the deodorant liquid may be either a permanent cylinder or a removable capsule. Alternatively, the dispenser head may be formed with both the permanent and removable systems.

4 Claims, 2 Drawing Figures

APPARATUS FOR SPRAYING DIVERSE FLUIDS WITHIN THE CAB OF A VEHICLE

BACKGROUND OF THE INVENTION

The present invention relates to controlled spraying systems and, more specifically, pertains to a method and apparatus for simultaneously spraying the interior of a vehicle with diverse fluids.

Car washing installations have been known and in use since 1897, see U.S. Pat. No. 589,345.

The evolution of such vehicle washing systems has resulted in such developments as automatic soap dispensers, white wall tire brushing machines, and more recently, hot wax applicators.

Each of the above mentioned improvements in the car washing installation art has proven to be greatly beneficial to the public in minimizing the amount of time necessary for one to take proper care of his vehicle.

Although the semi-automatic nature of existing car washing installations has greatly benefited car owners with respect to the exterior of their automobiles, little had been advanced by way of cleaning the interior of such vehicles. Of course, attendants may clean the interior of a car with vacuum cleaners and wash the inside windows and may even leave a deodorant device which may emit a pine odor, or the like.

Nevertheless, even though great strides had been made in providing machinery for cleaning and polishing the exteriors of vehicles, the interiors of such vehicles have been largely neglected.

Recently, the present inventor had provided a method and apparatus for simultaneously deodorizing and disinfecting the interiors of vehicles which is the subject matter of U.S. Pat. No. 3,891,149. Although this apparatus has been highly successful in operation, it is relatively expensive to build and consequently the number of car washing operations which can afford such apparatus is limited.

It would therefore be advantageous if an apparatus for simultaneously deodorizing and disinfecting the interiors or vehicles was provided which is uniquely simple yet virtually "fool proof" in operation.

It would also be beneficial if such an apparatus for simultaneously deodorizing and disinfecting the interiors of vehicles were provided which could be completely operated by the customer himself for a "self-service" type operation.

It would be further beneficial if such apparatus for simultaneously deodorizing and disinfecting the interiors of vehicles were provided which could be easily manipulated and controlled so as to deodorize and at least partially disinfect the interior space (the cab) of a vehicle. Such an interior operation would be an addition to the usual washing and polishing operation currently conducted by most automobile washing operations.

Further benefit could be realized by the provision of such an apparatus for simultaneously deodorizing and disinfecting the interiors of vehicles, which apparatus may be easily and swiftly moved to any point where it is to be used, which is completely self contained and which is instantly available for operation. Through such structure, one is enabled, for example, to roll the equipment into a position adjacent a gasoline pump, or for that matter to any other location on the premises of an automobile service station, automobile washing installation, parking garage, or the like and have the apparatus usable without making special connections.

OBJECTS AND SUMMARY OF THE INVENTION

It is therefore an object of the present invention to provide an apparatus for treating the interior of vehicles which solves many of the problems confronting the car wash industry today.

It is another object of the present invention to provide a method and apparatus for disinfecting, at least partially, the hard surfaces defining the interior portions i.e., the cab of a vehicle.

It is still another object of the present invention to provide an apparatus for disinfecting and deodorizing the interiors of vehicles which apparatus is far more economical to operate and inexpensive to buy than existing such apparatus so as to be practical for most automated car washing businesses.

It is yet another object of the present invention to provide an apparatus for deodorizing and disinfecting the internal surfaces of vehicles which apparatus permits the dispensing of a precise amount of a predetermined fluid substance.

It is a further object of the present invention to provide an apparatus for simultaneously dispensing diverse disinfectant and deodorizing fluids which apparatus provides a customer with a choice of scents for the deodorant liquid to be dispersed.

It is still another object of the present invention to provide an apparatus for simultaneously dispensing a disinfectant and a deodorizing spray which apparatus is easy to manufacture and may be portable.

At least some of the above objects are achieved by the provision of an apparatus wherein a liquid disinfectant is aspirated by a pressurized gas passing through a hose and discharged through a dispensing head. A reservoir containing a precise amount of liquid deodorant is associated with the dispensing head and communicates with the pressurized gas and deodorant carried through and dispensed from said dispensing head.

BRIEF DESCRIPTION OF THE DRAWINGS

While the invention is particularly pointed out and distinctly claimed in the concluding portion of the following specification, a preferred embodiment is set forth in the following detailed description which may be best understood when read in connection with the accompanying drawings in which:

DETAILED DESCRIPTION OF THE PREFERRED EMBODIMENT

Figure 1:
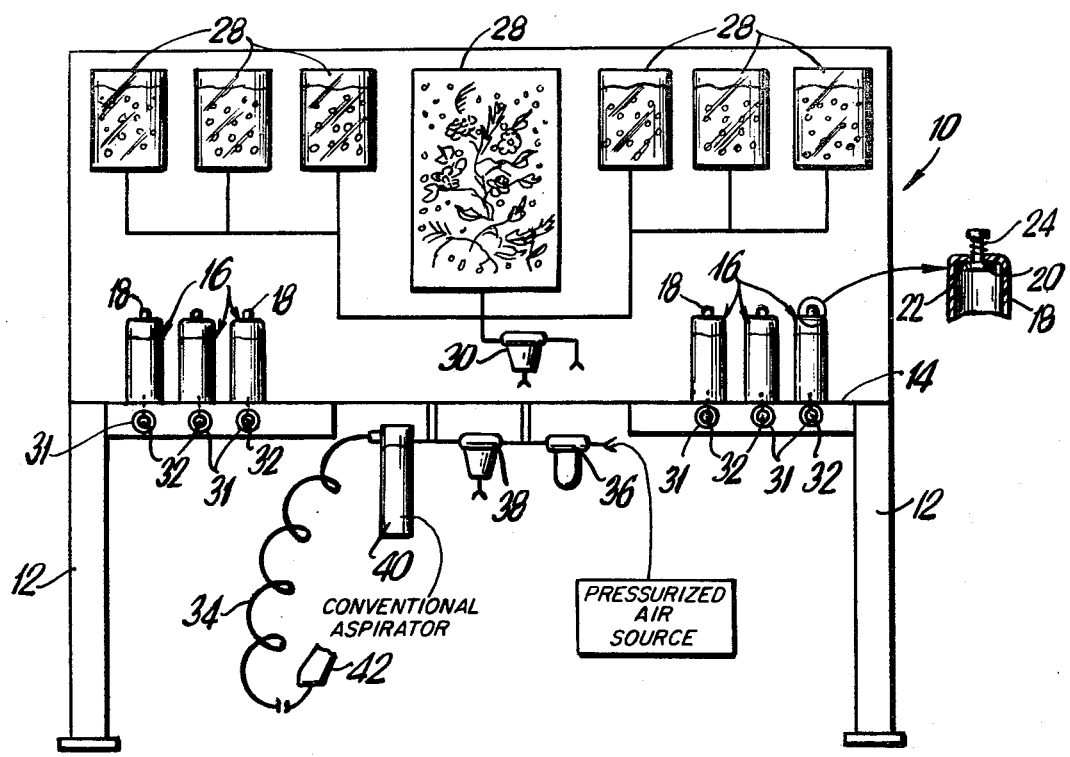
FIG. 1 shows a console arrangement for the apparatus according to the present invention.

Referring now to the drawings in which like numerals are used to indicate like parts throughout the various views thereof, FIG. 1 shows a console and display for use in association with the present invention.

The console 10 generally comprises a structural frame 12 having a horizontal surface 14 upon which are supported a plurality of containers of liquid deodorant 16. The liquid deodorant containers 16 may be provided with relief valve type caps 18. Caps 18 may comprise cylindrical internally threaded members having a radially extending upper end formed with an opening extending from within the cap to the ambient surrounding the cap. A stopper 20 may be urged into sealing cooperation with the internal surface 22 of the cap to close off the opening by means of a spring 24. In operation, when the pressure within container 16 and the cap 18 becomes less than ambient atmospheric, the stopper member 20 is pulled away from the opening in the cap to thus prevent the collapsing of the containers. This arrangement further provides for a closed system as opposed to an open vented system through which an undesirable amount of liquid deodorant may be lost by evaporation.

The console display 10 may be provided with decorative means such as colored water or other liquid disposed in containers 28 through which bubbles are generated by passing compressed air through valve 30.

Each liquid deodorant container 16 is provided with a discharge outlet 32 for dispensing liquid deodorant. Each of the liquid deodorant containers 16 may be used as a reservoir for a different liquid deodorant scent.

The console display 10 may further be provided with an air line or hose 34 connected to a source of compressed gas 35 (preferably air). A conventional air filter 36 and valve 38 may be provided in the air line 34, which then passes through a source of liquid disinfectant 40. The pressurized gas passing through the disinfectant reservoir aspirates, vaporizes and meters disinfectant in any conventional manner through the air line 34 to the dispenser head 42 shown in more detail in FIG. 2.

Figure 2:
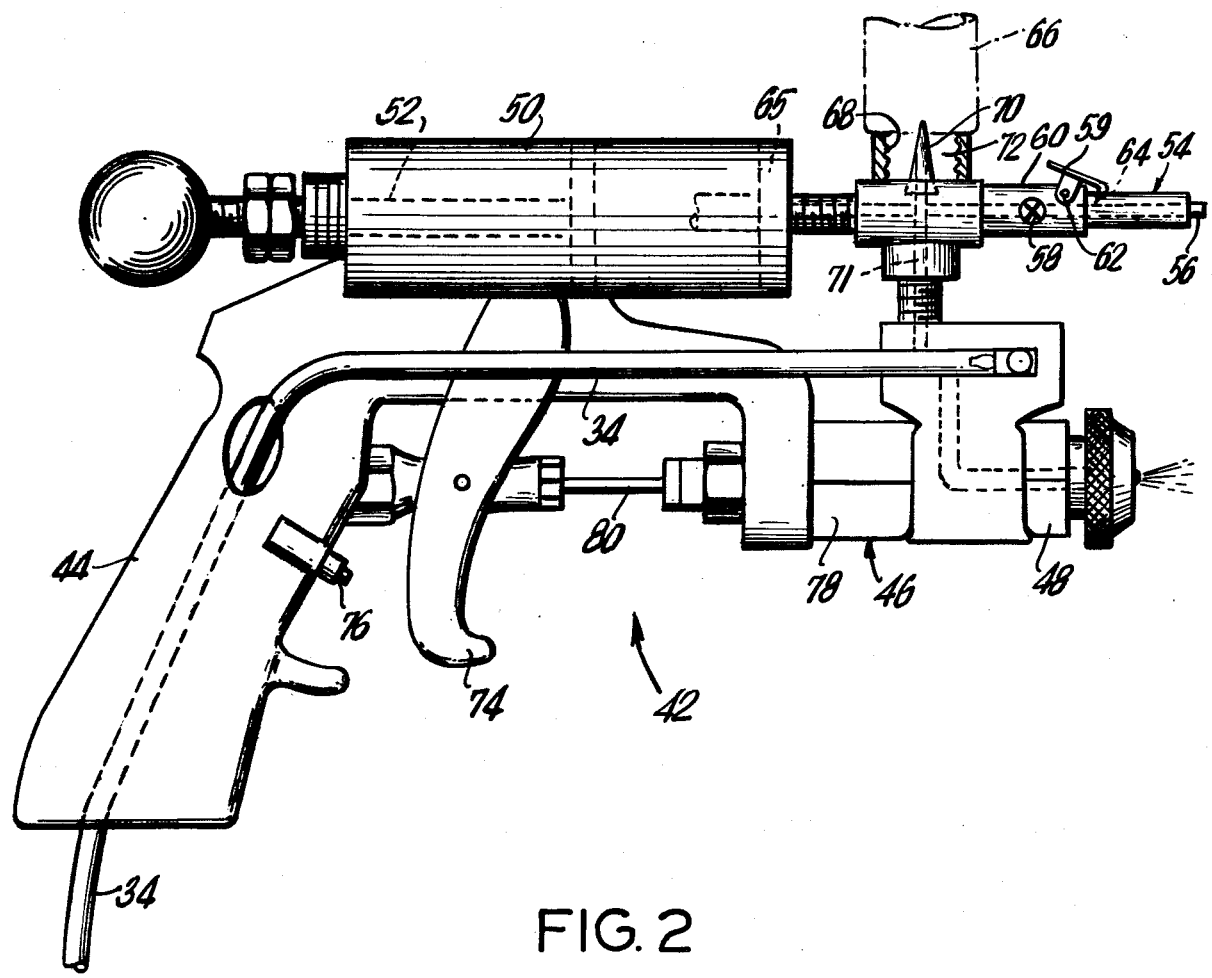
FIG. 2 shows a dispenser head according to the present invention.

Referring now to FIG. 2, a gun-type dispenser head is generally shown as 42 and comprises a handle portion 44 and a barrel portion 46. The air line 34 passes through the dispenser head and communicates with a conventional spray head 48. A charge cylinder 50 may be mounted on the gun-type discharge head as a means for storing a measured amount of liquid deodorant. The cylinder 50 in turn may be formed with a plunger arrangement 52 for drawing in liquid deodorant through tube 54 when the tip 56 is inserted into one of the charge outlets 32 of the liquid deodorant containers 16. A check valve 58 may be provided to prevent deodorant liquid from flowing back and out through tip 56 when the gun 42 is tilted downwardly. The valve 58 thus prevents deodorant from escaping from the passageway 71 communicating the stored deodorant with the pressurized gas flowing through line 34. An attachment clip 59 may be mounted on top of the housing 60 of the tube 54. Attachment clip 59 is mounted to be spring urged downwardly and pivotable about pin 62 in the upward direction upon the engagement of cam surface 64 with the surface 31 defining the charging outlets 32 to hold the tip 56 in operational engagement within an outlet 32 while cylinder 50 is being charged.

Alternatively, the plunger 52 may be placed in the extreme inward posture indicated as 65 and a disposable plastic vial of liquid deodorant 66 may be threadedly engaged within the internally threaded collar 68 so that the hollow needle 70 may puncture through the plastic seal 72 upon the mated engagement of the vial 66 within the threaded collar 68. Upon such a puncture of the vial, the precisely measured amount of liquid deodorant contained within the vial 66 is aspirated through tube 71 to the air line 34 and out through the spray nozzle 48.

In operation, an attendant at a car wash or the like may insert the tube tip 56 into a deodorant charge outlet 32 of a selected scent and the plunger 52 within charge cylinder 50 may be drawn back so as to draw the selected deodorant liquid into the cylinder 50. Since the cylinder 50 has a fixed volume, a precisely measured amount of liquid deodorant is drawn from the container 16. Then, when the attendant depresses the trigger 74 to engage microswitch 76, air valve 38 is opened (or a gas compressor may be activated) thus aspirating liquid disinfectant from reservoir 40 and liquid deodorant from the cylinder 50. Of course, a conventional spray head valve arrangement 78 may be provided which is opened in response to the closing of trigger 74 by the reciprocal movement of valve stem 80.

Alternatively, disposable plastic vials 66, each containing a liquid deodorant of a specific scent may be dispensed from a vending machine to a customer who in turn threadedly engages the vial within the collar 68 so that the hollow needle 70 (which may be formed as a portion of tube 54) punctures the seal 72 of the vial 66. Thereafter, upon the customer's depressing of the trigger 74, microswitch 76 is actuated and spray valve 78 is opened so that the combination of liquid deodorant and liquid disinfectant is sprayed through the spray head 48.

While what has been described herein is a preferred embodiment of the present invention it is, of course, to be understood that various modifications and changes may be made therein without departing from the present invention. It is therefore intended to cover in the following claims all such modifications and changes as may fall within the true spirit and scope of the present invention.

What is claimed is:

1. Apparatus for dispersing diverse fluid substances within a vehicle interior comprising:
    a source of liquid disinfectant;
    a source of pressurized gas;
    said source of liquid disinfectant being connected by a hose to said source of pressurized gas;
    said source of pressurized gas being connected with a first terminal end of said hose, and said source of liquid disinfectant being connected intermediate said first terminal end of said hose and a second terminal end thereof;
    a dispenser being provided on said second terminal end of said hose and being operable upon manual actuation to dispense vaporized liquid disinfectant through said hose under the pressure of said pressurized gas;
    means mounted on said dispenser head for storing a measured amount of liquid deodorant and generally comprising a cylinder mounted on said dispenser, said cylinder being provided with a plunger arrangement for drawing liquid into said cylinder through a tube;
    a plurality of liquid deodorant containers being provided with discharge outlets;
    a portion of said tube being formed to penetrate into each of the said discharge outlets of said liquid deodorant containers, whereupon liquid deodorant from one of said containers is drawn into said cylinder upon the withdrawing of said plunger while said free end of said tube is engaged within a said discharge outlet of a liquid deodorant container; and
    said means for storing liquid deodorant being formed with a passageway communicating said liquid deodorant with the pressurized gas and vaporized disinfectant passing through said dispenser, whereby said dispenser is operable upon the actuation thereof to spray both disinfectant and deodorant dispersed in and aspirated by the pressurized gas passing through and discharging from said dispenser.

2. The apparatus according to claim 1, with the addition of a check valve mounted in said tube and normally positioned to block off the passageway of said tube between said cylinder and said free end thereof.

3. Apparatus according to claim 1, wherein each said container for the liquid deodorant is provided with a removable cap;

said removable cap having an opening therein and a sealing means urged by spring bias against an inner surface of said cap to seal off said opening;

whereby, upon the reduction of pressure within a said container of liquid deodorant below ambient atmospheric pressure, said sealing means is moved away from said opening against the spring bias to equalize the internal pressure of said container with the ambient atmospheric pressure.

4. Apparatus according to claim 1, wherein an attachment clip is mounted on said tube, said attachment clip being pivotable and formed with a camming surface whereby, said clip is first cammed outwardly and then is urged back into a locking position with respect to the surface defining a said discharge outlet in response to the insertion of said free end of said tube into said discharge outlet.

* * * * *